United States Patent [19]

Schmid

[11] Patent Number: 5,059,077

[45] Date of Patent: Oct. 22, 1991

[54] FIXING ELEMENT FOR LOW STRENGTH MATERIALS

[75] Inventor: Paul M. Schmid, Camarillo, Calif.

[73] Assignee: Isolink Ltd., Nassau, The Bahamas

[21] Appl. No.: 515,404

[22] Filed: Apr. 27, 1990

[30] Foreign Application Priority Data

Nov. 13, 1989 [CH] Switzerland .................... 4082/89

[51] Int. Cl.⁵ .................... F16B 23/00; F16B 45/00
[52] U.S. Cl. .................... 411/400; 411/397; 411/426; 411/908; 248/217.4
[58] Field of Search ............. 411/374, 397, 400, 401, 411/919; 248/217.4, 74.3, 74.4

[56] References Cited

U.S. PATENT DOCUMENTS

| | | | |
|---|---|---|---|
| 350,209 | 10/1886 | Parmelee | 411/400 |
| 354,123 | 12/1886 | Flynn | 411/397 |
| 633,909 | 9/1899 | Sanford | 248/217.4 |
| 1,250,597 | 12/1917 | Kyle | 411/400 |
| 1,270,036 | 6/1918 | Leclaire | 248/217.4 |
| 1,365,508 | 1/1921 | Kucewicz | 411/400 |
| 1,491,203 | 4/1924 | Enoch | 248/217.4 |
| 2,086,928 | 7/1937 | Tiryakian | 248/217.4 |
| 3,126,185 | 3/1964 | Christman | 248/74.3 |
| 3,224,721 | 12/1965 | Malmquist | 248/217.4 |
| 3,421,187 | 1/1969 | Ryder | 248/74.3 |
| 4,756,653 | 7/1988 | Berger | 411/908 |

FOREIGN PATENT DOCUMENTS 0205994 10/1989 European Pat. Off. .
2279010 2/1976 France .................... 248/74.3

*Primary Examiner*—Neill R. Wilson
*Attorney, Agent, or Firm*—Wenderoth, Lind & Ponack

[57] ABSTRACT

A screw-in plug provided with a pointed conical thread section (4) and an insertion point (5) has a stop collar (6) adjoining the thread section (4). A head (7) moulded onto the stop collar (6) serves as a bearer of a screwing-in slot (13) and of a moulded-on holding member (14). The plug, preferably made in one part out of plastic, can be screwed into any wall covering of low strength, and permits the provisional or permanent mounting of varied useful objects.

20 Claims, 2 Drawing Sheets

FIXING ELEMENT FOR LOW STRENGTH MATERIALS

BACKGROUND OF THE INVENTION (1) Field of the Invention

The invention relates to an element for fixing construction elements on wall coverings, made of materials of low inherent strength in particular insulation coverings, e.g. rigid foamed plastic, and more particularly to a fixing element having a basic body made of plastic bearing an external thread.

(2) State of the Prior Art

In rooms which have wall coverings made of materials of low inherent strength, e.g. cooling rooms or the like which have inside coverings made of insulation material, the problem arises that, after installing the wall covering, objects have to be mounted on a wall or on the ceiling of the room, such as for example switching and control equipment, lighting fixtures or, for example, even panels, for example made of aluminium or plastic, for the panelling of the wall covering. Since the material used for the wall covering, e.g. rigid foamed polyurethane, has a low inherent strength, and thus known elements for fixing construction elements cannot grip firmly, each construction element to be mounted in a room with covered walls has to be mounted using relatively complex substructures, e.g. using L-bars, which are passed through the insulation layer and connected to the masonry of the room. However, the wall covering is then pierced by substructures of this type. By this means, in the case of the wall covering being, for example, an insulation covering, undesired hot and cold thermal bridges occur; in particular in cooling or refrigeration rooms, a water vapour block is applied under the insulation covering. Due to the substructures necessary for fixing construction elements which pierce the wall covering, this water vapour block is impaired in its function at places where elements for fixing are passed through the insulation covering.

It is true that an element constructed as a plug with an external thread is known according to DE-A-2,256,938. However, this serves for fixing heavy objects on walls made of, for example, plaster which, compared with insulation coverings, still have higher loading capacity. The known element constructed as a plug can be screwed with a positive fit into a borehole provided for this purpose, its external thread constructed as a self-cutting thread being intended to be screwed into the borehole into the material of the wall with removal of wall material. The known element is not suitable for anchorage in wall coverings made of relatively soft insulation material, e.g. rigid foamed polyurethane. It always requires a prefabricated borehole, by which the strength of the structure of the wall material is weakened from the very start. Moreover, a borehole has the disadvantageous effect of reducing the insulation function of a wall covering. Since the self-cutting thread of the known element also removes wall material in the surroundings of the borehole while it is being screwed into the borehole, a further weakening of the material structure also takes place which makes the known element unsuitable for the applications described above. Moreover, the known element harbours the disadvantage that it can only be screwed into the assigned borehole using special tools.

SUMMARY OF THE INVENTION

The underlying object of the invention is to provided an element of the type mentioned above which allows fixing of a construction element on a wall covering, serving in particular for insulation, made of a material with no inherent strength without the insulation function of the wall covering being rendered ineffective in some places and without the necessity of prior mounting of a borehole.

A fixing element according to the invention can be introduced into the material in a simple manner and has an outwardly projecting profile due to its external thread, with the aid of which it can be anchored so firmly in the material that the construction element to be mounted can be fixed on it using conventional fixing means and, in this manner, receives a secure grip.

The plug according to the invention can advantageously be screwed into the insulation covering, the insulation material being compressed and compacted in the thread turns and thus offering the plug an adequate grip. The greater the thread depth is and the more thread turns the plug has, the more secure is its grip in the wall covering. The plug can advantageously be screwed so far into the wall until it has sufficient grip but the wall covering is not completely pierced such that it retains its effectiveness, in particular its insulation property. Since the wall covering is interlocked with the plug in the thread turns of the external thread, any possible function of the wall covering as a water vapour block, advantageously, not impaired by the plug. The construction element to be mounted can be mounted on the freely accessible end face of the plug introduced into the wall covering with the aid of conventional fixing means, e.g. screws.

Since the element according to the invention has the shape of a pointed cone, it can penetrate like a screw into the wall covering without greater resistance.

The pitch of the element according to the invention constructed as a pointed cone is preferably constant over the entire length of the external thread such that the external thread has a lead becoming larger towards the point of the pointed cone, which lead enhances easy penetration of the plug into the wall covering and at the same time a secure grip of the inserted plug.

The external thread of the element according to the invention is preferably a pointed thread because, due to its increased friction fit, the pointed thread is particularly suited for elements of the type concerned here.

Means for detachable mounting of objects are mounted on the holding head.

The head present at the front side and constructed as a spanner fitting has the advantage that a commercial manual tool, preferably a spanner, in particular a ring spanner, can be applied so that the element according to the invention can be screwed easily and securely into the wall covering and, if desired, can be unscrewed again.

The element according to the invention is preferably moulded out of plastic, in particular polyethylene. The element moulded out of plastic is itself advantageously a thermal insulator so that any desired insulation properties of the wall covering are hardly changed at the location of the plug.

Furthermore, the polyethylene preferably used as material for the element according to the invention is temperature-resistant and impact-resistant.

In preferred developments of the element according to the invention, the pitch of the external thread is 7 to 11 mm, preferably 9 mm, and the thread depth is 6 to 9 mm, preferably 7.5 mm. The resulting thread depth is thus relatively deep. An external thread which has the preferred dimensions in the said tolerance ranges has been experienced to give the element according to the invention a secure grip, in particular in wall coverings made of rigid foamed plastic.

BRIEF DESCRIPTION OF THE DRAWINGS

Exemplary embodiment are illustrated in the drawings, in which:

FIG. 1 illustrates a side view of a plug according to the invention. The plug has an external thread 1 constructed as a pointed thread and is constructed in the shape of a pointed cone. The pitch of the external thread 1 is constant over the length of the plug such that the angle of lead of the external thread 1 increases towards the point of the pointed cone.

At its front face, the plug has a hexagonally constructed head 2 as a spanner fitting to which a spanner can be applied.

Figure 1:
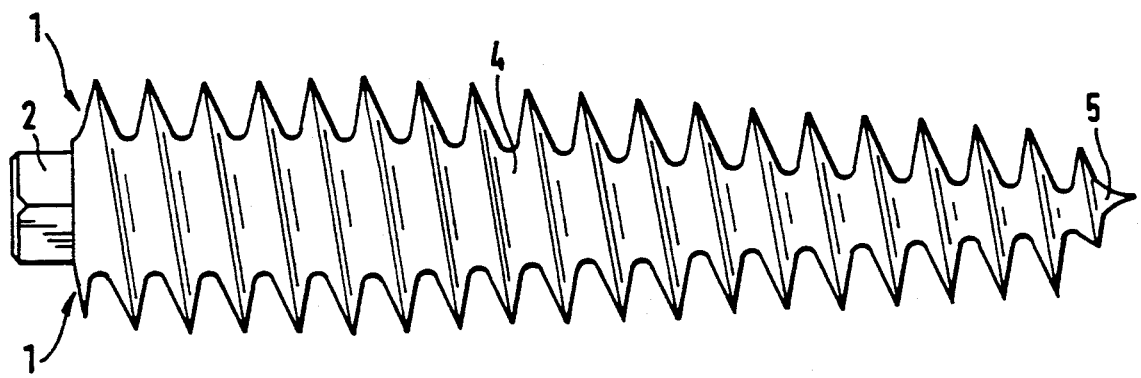
FIG. 1 shows a lateral view of a prior art device.
Figure 2:
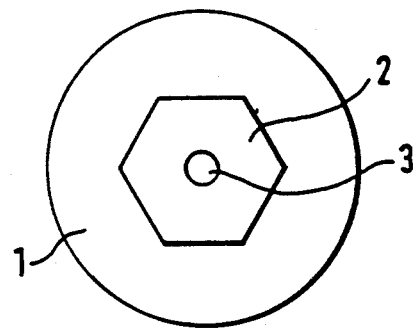
FIG. 2 shows a front view of the device according to FIG. 1.
Figure 3:
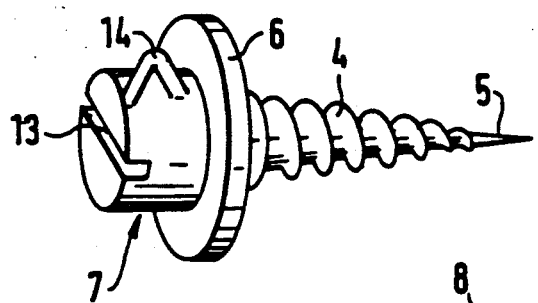
FIGS. 3 to 8 show.
Figure 4:
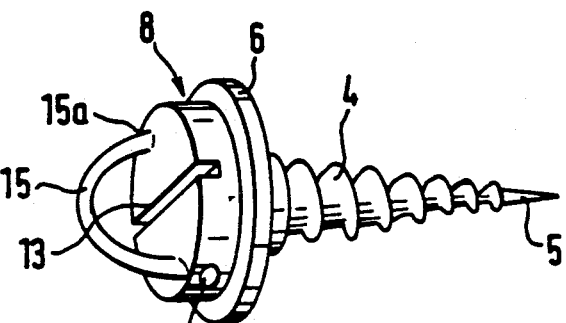

It can be seen in FIG. 2, in which the same construction elements are given the same reference numerals as in FIG. 1, that the plug has an inside borehole 3 starting in the head 2 and extending along its longitudinal mid-axis, into which inside borehole a fixing means, e.g. a screw, can be introduced.

All the embodiments of the present invention illustrated in FIGS. 3–8 have the common factor that they are manufactured from a dimensionally stable plastic and have a pointed conical threaded body 4 which extends into a sharp point 5. In a preferred exemplary embodiment, the cone angle of the point 5 is between 5° and 15° and has the task of centering the device when it is first placed on, and of facilitating its initial penetration into, the material of the wall covering.

Figure 5:
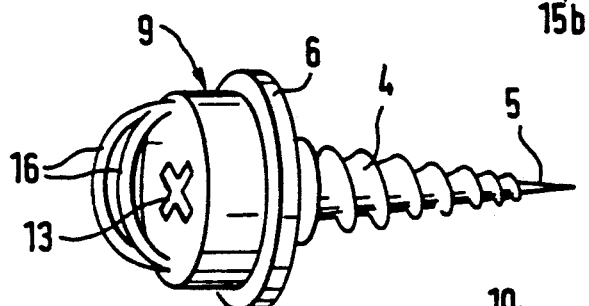

Adjoining the threaded body 4 on the section opposite the point 5 is a stop collar 6 (FIG. 3), which is preferably of circular cylindrical construction, and which has the task of precisely limiting the penetration depth of the device when said device is screwed in. Moreover, the stop collar 6 serves as a base for a holding head 7 (FIG. 3) which, in turn, fulfils two main functions: the holding head 7, preferably of circular cylindrical construction, which is given the reference numerals 7 to 12 in FIGS. 3 to 8, serves on the one hand as the bearer of a slot 13 which permits the application of a screwdriver so that the plug can be screwed in with relatively great force. However, it has been shown otherwise that the plug, in particular above a certain size, can be screwed very easily by hand into any material of low strength and is nevertheless anchored securely in said material. The slot 13 can either be constructed as a simple linear slot according to FIGS. 3, 4, 6 and 8 or, as shown in FIGS. 5 and 7, as a recessed cross, the latter design being given preference.

According to the second function of the holding head 7 to 12, any holding organ can be moulded onto the head projecting out of the wall, which holding organ can serve for the detachable, provisional or permanent reception of the most varied objects. Thus, in an uncomplicated manner and at any point, additional holding devices can be provided which serve for mounting objects of use, tools etc. in living rooms, kitchens, bathrooms or even in workshops, production halls etc. This device can even be used for the permanent fixing of wall mirrors, paintings etc.

The fixing organ moulded onto the holding head 7 to 12 can then have the most varied shape depending on the application. According to FIG. 3 this is a simple hook 14 on which towels, kitchen utensils or small tools, for example, can be hung. According to FIG. 4, the fixing organ is a shackle 15 which is firmly anchored on one side at the point 15a on the holding head 8, but, with the other free end bearing a catch knob, it can be plugged into a recess 15b in the shape, for example, of a keyhole and can be secured by this means on the holding head 8. The fixing organ denoted as 16 in FIG. 5 is a double shackle which exposes the frontal access to the recessed cross 13.

Figure 6:
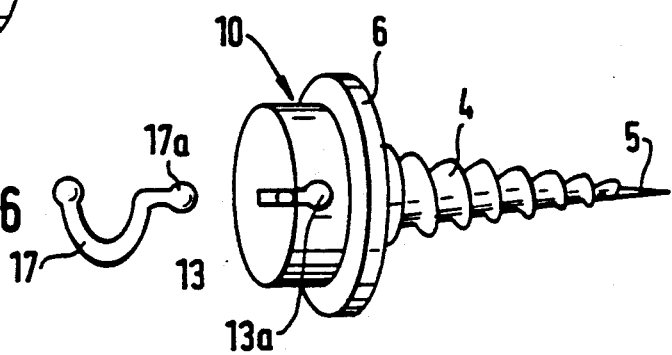
Figure 7:
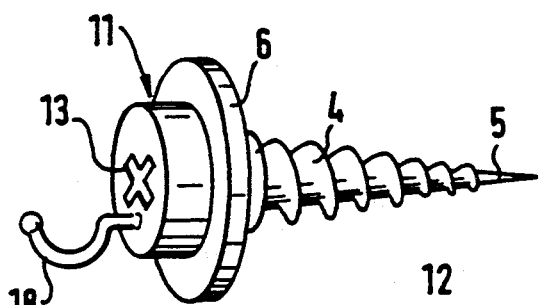
Figure 8:
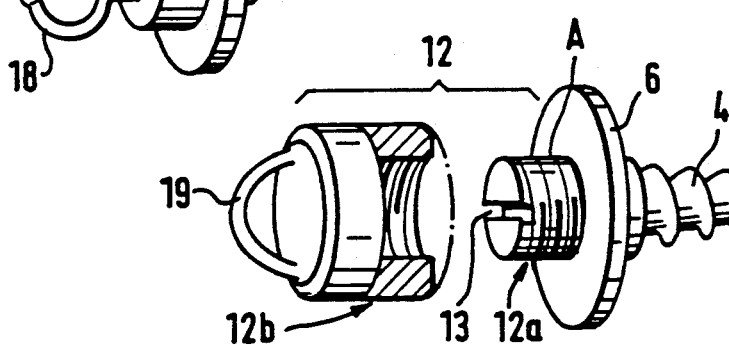

According to FIG. 6, a groove 13 is moulded into the holding head 10, which groove is extended at the groove base to form a cylindrical channel 13a. In this manner, a hook 17 provided with a knob-like thickening 17a can be pushed into the groove 13 up to the lateral stop, in which case the groove 13 can, if required, still serve for screwing in the plug by means of a screwdriver. FIG. 7 shows a hook 18 moulded onto the holding head 11. According to FIG. 8, the holding head 12 is constructed in two parts: an inner part 12a provided with an external thread A and a slot 13 is moulded onto the collar 6; a second part 12b is constructed as a crown nut with an internal thread and can be screwed onto the inner part 12a, can be removed, if required, without problems and, if appropriate, can be replaced by another one. While the part 12b has a closed shackle 19, the most varied holding organs can be stored and, if required, screwed onto the inner part 12a.

Of course, the holding head does not have to be constructed as a circular cylindrical solid part separate from the fixing organ, but can itself be moulded directly onto the collar 6 in the shape of a hook, shackle etc., in which case the slot required for operation by means of a screwdriver would then have to be mounted in the central region of the collar 6.

I claim:

1. A fixing element for connection to materials of relatively low strength, comprising a unitary, one piece plastic body having:

an external thread means formed on said one-piece plastic body for compressing and compacting a low strength material in the thread turns of said external thread means as said unitary one piece plastic body is threaded into the low strength material, said external thread means comprising deep, in comparison with the pitch thereof, external threads, in the shape of a cone, and having a larger diameter end and a smaller diameter end;

an unthreaded conical tip unitary with said external threads at said smaller diameter end thereof for penetration of said unitary one piece plastic body into the low strength material, said external threads in the shape of a cone and said unthreaded conical tip having a common cone axis;

a stop collar unitary with said external threads at said larger diameter end thereof, said stop collar having a larger diameter than said larger diameter end of said external threads, wherein said unitary one piece plastic body has a central axis coincident with said common cone axis, said stop collar being centered on said central axis, and said stop collar having a first surface facing said external threads and said unthreaded conical tip for engagement with the low strength material and a second surface facing away from said external threads and said unthreaded conical tip; and a head portion unitary with and centrally disposed on said stop collar and extending from said second surface of said stop collar in a direction away from said external threads and said unthreaded conical tip, said head portion having a diameter smaller than said diameter of said stop collar, and said head portion comprising turning means thereon and unitary therewith for turning said unitary one piece body to cause said external thread means to be engaged with the low strength material, said turning means being disposed substantially centrally of said head portion and said stop collar and substantially symmetrically with respect to said central axis.

2. The fixing element of claim 1, wherein said turning means comprises a slot formed in said head portion.

3. The fixing element of claim 1, wherein said turning means comprises a pair of slots formed in said head portion perpendicular to each other.

4. The fixing element of claim 1, wherein said head portion further comprises holding means unitary therewith for holding an object to be supported by said unitary one piece body when said unitary one piece body is threaded into the low strength material.

5. The fixing element of claim 4, wherein said turning means comprises a slot formed in said head portion.

6. The fixing element of claim 4, wherein said turning means comprises a pair of slots formed in said head portion perpendicular to each other.

7. The fixing element of claim 4, wherein said holding means comprises a hook.

8. The fixing element of claim 4, wherein said holding means comprises a shackle.

9. The fixing element of claim 4, wherein said holding means comprises a double shackle.

10. The fixing element of claim 1, wherein said external threads in the shape of a cone and said unthreaded conical tip have a common angle of 5° to 15°.

11. The fixing element of claim 1, wherein said fixing element consists of said unitary, one piece body, and said unitary one piece body consists of said external thread means, said unthreaded conical tip, said stop collar and said head portion.

12. The fixing element of claim 1, wherein said external threads in the shape of a cone taper from said stop collar to said unthreaded conical tip.

13. The fixing element of claim 1, wherein said head portion is cylindrical and coaxial with said central axis.

14. The fixing element of claim 1, wherein said external threads have a constant pitch.

15. The fixing element of claim 14, wherein said constant pitch is between 7 and 11 mm.

16. The fixing element of claim 15, wherein said constant pitch is 9 mm.

17. The fixing element of claim 15, wherein the depth of said external threads is 6 to 9 mm.

18. The fixing element of claim 17, wherein the depth of said external threads is 7.5 mm.

19. The fixing element of claim 1, wherein the depth of said external threads is 6 to 9 mm.

20. The fixing element of claim 19, wherein the depth of said external threads is 7.5 mm.

* * * * *